March 29, 1932.   L. W. CHASE   1,851,494
THREE-ROW LISTED CORN CULTIVATOR
Filed Aug. 30, 1929
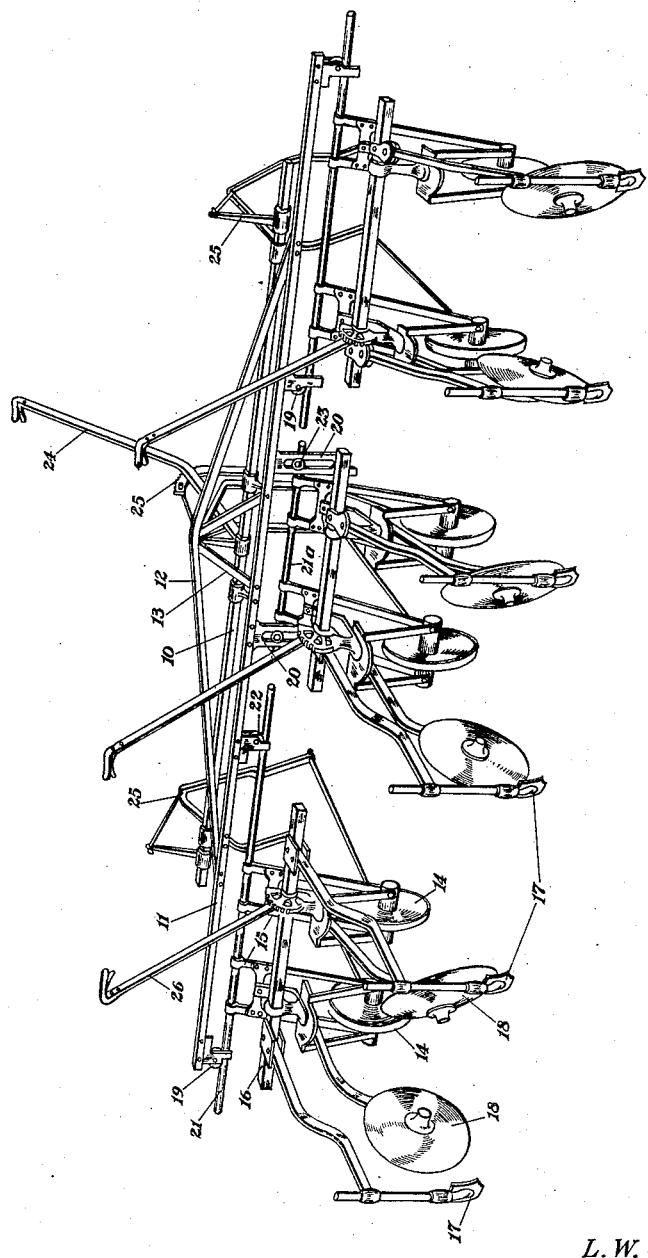
L. W. Chase  Inventor
By  Emil F. Lange
Attorney Patented Mar. 29, 1932

1,851,494

UNITED STATES PATENT OFFICE

LEON W. CHASE, OF LINCOLN, NEBRASKA, ASSIGNOR TO CHASE PLOW COMPANY, OF LINCOLN, NEBRASKA, A CORPORATION OF NEBRASKA

THREE-ROW LISTED CORN CULTIVATOR

Application filed August 30, 1929. Serial No. 389,566.

My invention relates to cultivators and more particularly to implements for cultivating listed corn, its primary object being the provision of an implement for cultivating three rows of listed corn at a time.

Another object which I have in view is the provision of a cultivator frame with cultivator gangs so constructed and arranged that the frame with one cultivator gang will be automatically centered over one row of corn while the other cultivator gangs have a movable relation with respect to the frame so that the furrow guide wheels will automatically maintain them in centered relation over the other two rows of corn.

Another object which I have in view is the provision of an implement frame having three gangs of cultivators, one of the gangs having a floating relation with respect to the frame and the other two gangs having a laterally slidable relation in the frame.

Having in view these objects and others which will be pointed out in the following description, I will now refer to the drawing, in which The figure is a view in perspective showing my invention.

The frame of my implement includes front and rear beams 10 and 11 which are rigidly maintained in parallel and spaced apart relation. The rear beam 11 is braced at 12 and 13. The rear beam also supports forwardly projecting brackets having bearings in their forward ends for supporting the front beam 10. The rear beam also carries depending brackets for supporting the individual cultivator gangs as will be subsequently described.

Each gang includes a pair of furrow guide wheels 14 individually carried in yokes 15. Pivotally secured to both yokes of a gang is a transverse beam 16 which supports the cultivator shovels 17. The cultivating discs 18 are secured as shown to the connections between the yokes 15 and the beam 16. Each gang furthermore includes a fender which is not here shown since it is no part of the present invention. The details of the gangs are fully disclosed in the Patent No. 1,745,740, issued February 14, 1930, to which reference is made. The present invention is largely an adaptation of the gangs of that cultivator for use in a three-row cultivator.

The rear beam 11 has two pairs of depending brackets 19 and one pair of depending brackets 20. The brackets 19 are in yoke form for supporting the rods 21, the brackets having spools 22 journalled therein for receiving the thrust from the rod 21. The lateral movement of the furrow guide wheels 14 in the furrow is thus transmitted to the rod 21 which is free to move transversely of the beam, the spools 22 serving as antifriction devices to facilitate the automatic adjustment of the gangs. As shown in the drawing, the two end gangs thus have free movements on the frame transversely of the frame, the result being that these two gangs will be centered over the corn row regardless of the movements of the frame in relation to the corn rows during cultivation. The central gang, however, is secured against lateral movements of the rod 21a by means of pins 23 which project from the rods and which are adapted to slide up and down in the elongated vertical slots of the brackets 20. The single gang, however, is provided with furrow guide wheels which maintain the direction of movement of the gang in alignment with the corn row. Since this movement cannot take place independently of the implement frame, the movement must be transmitted to the implement frame. The result is that the central gang thus automatically maintains the implement frame in centered relation with the corn row. The elongated slots in the bracket 20 permit a floating movement for the rod 21a and consequently for the entire central gang.

Secured to the front beam 10 is a lever 24 within convenient reach of the operator. The purpose of this lever is to permit the rocking of the beam 10 about its longitudinal axis. The beam 10 is also provided with connections at 25 for rocking the gangs about the axes of the rods 21 and 21a. The lever 24 thus functions to raise or lower all of the cultivator shovels simultaneously. Each gang is further provided with a lever 26 for raising and lowering the cultivator shovels 17.

Having thus described my invention in such full, clear, and exact terms that its construction and operation will be readily understood by others skilled in the art to which it pertains, what I claim as new and desire to secure by Letters Patent of the United States is:

1. A three-row listed corn cultivator including an implement frame, slotted brackets depending from said frame, a cultivator gang secured in said slotted brackets for free movement in a vertical plane, said gang including a pair of furrow guide wheels for maintaining the travel of said frame in alignment with a furrow, a pair of cultivator gangs positioned at opposite ends of said frame, two pairs of brackets depending from said frame, said last named brackets being provided with apertures in transverse alignment, antifriction devices in the apertures of said last named brackets, rods supported in said apertured brackets for slidable movement transversely of the line of draft, a pair of cultivator gangs supported on said rods, and furrow guide wheels on said last named cultivator gangs for automatically maintaining the travel of said last named gangs in alignment with the furrows independently of the movements of said first named gang.

2. In combination, an implement frame, a cultivator gang secured to said frame for automatic up and down adjustment relative to said frame in response to the ridges and depressions of the field, a second cultivator gang secured to said frame for automatic lateral adjustment relative to said frame in response to variations in the distance between two furrows of the field, means for individually lifting or lowering said two gangs, and means for simultaneously raising or lowering both of said gangs, said two raising or lowering means being independent of each other.

In testimony whereof I affix my signature.

LEON W. CHASE.